(12) United States Patent
Vizzini et al.

(10) Patent No.: US 12,516,149 B2
(45) Date of Patent: Jan. 6, 2026

(54) FLAME RETARDANT EPOXY RESIN COMPOSITION

(71) Applicant: Toray Industries, Inc., Tokyo (JP)

(72) Inventors: Katrina P. Vizzini, Tacoma, WA (US);
Benjamin Lehman, Tacoma, WA (US);
Jonathan Hughes, Tacoma, WA (US);
Alfred P. Haro, Tacoma, WA (US);
Toshiya Kamae, Tacoma, WA (US)

(73) Assignee: Toray Industries, Inc., Tokyo (JP)

( * ) Notice: Subject to any disclaimer, the term of this patent is extended or adjusted under 35 U.S.C. 154(b) by 214 days.

(21) Appl. No.: 17/767,564

(22) PCT Filed: Oct. 14, 2020

(86) PCT No.: PCT/IB2020/000850
§ 371 (c)(1),
(2) Date: Apr. 8, 2022

(87) PCT Pub. No.: WO2021/074684
PCT Pub. Date: Apr. 22, 2021

(65) Prior Publication Data
US 2024/0101755 A1    Mar. 28, 2024

Related U.S. Application Data

(60) Provisional application No. 63/082,281, filed on Sep. 23, 2020, provisional application No. 62/923,223, filed on Oct. 18, 2019.

(51) Int. Cl.
*C08G 59/32* (2006.01)
*C08G 59/38* (2006.01)
(Continued)

(52) U.S. Cl.
CPC ......... *C08G 59/3227* (2013.01); *C08G 59/38* (2013.01); *C08G 59/4021* (2013.01);
(Continued)

(58) Field of Classification Search
None
See application file for complete search history.

(56) References Cited

U.S. PATENT DOCUMENTS 5,624,979 A   4/1997  Kleiner et al.
5,648,171 A   7/1997  von Gentzkow et al.
(Continued)

FOREIGN PATENT DOCUMENTS

EP   1731553 A1   12/2006
EP   2878617 A1   6/2015
(Continued)

OTHER PUBLICATIONS

Extended European Search Report for European Application No. 20876704.6, dated Oct. 11, 2023, 16 pages.
(Continued)

*Primary Examiner* — Megan McCulley
(74) *Attorney, Agent, or Firm* — Buchanan Ingersoll & Rooney PC (57) ABSTRACT

This invention relates to a flame retardant epoxy resin composition which includes an epoxy resin structure having an epoxy functionality of 2 or more with a measured total heat release value of not more than 23 kJ/g as well as an organic phosphinic acid structure (in reacted or unreacted form), as well as a prepreg, and a fiber reinforced composite material prepared using the epoxy resin composition. More specifically, an epoxy resin composition is provided that contains a combination of particular types of epoxy resins and curatives that provide sufficient flame retardance when cured at 163° C. for 15 minutes. The epoxy resin systems are also suitable for preparing a fiber-reinforced composite material that will also provide sufficient flame retardance for a variety of applications.

7 Claims, 1 Drawing Sheet

(51) Int. Cl.
*C08G 59/40* (2006.01)
*C08G 59/68* (2006.01)
*C08J 5/24* (2006.01)
*C08K 5/5313* (2006.01)

(52) U.S. Cl.
CPC ....... *C08G 59/4064* (2013.01); *C08G 59/686* (2013.01); *C08J 5/249* (2021.05); *C08K 5/5313* (2013.01); *C08J 2363/02* (2013.01)

(56) References Cited

U.S. PATENT DOCUMENTS

| | | | |
|---|---|---|---|
| 6,548,627 | B1 | 4/2003 | Hörold |
| 2006/0035548 | A1* | 2/2006 | Goto .................. B29C 70/22 156/60 |
| 2014/0350149 | A1 | 11/2014 | Schneider et al. |
| 2017/0221974 | A1 | 8/2017 | Kimura et al. |
| 2019/0027913 | A1 | 1/2019 | Sang et al. |
| 2019/0115559 | A1 | 4/2019 | Chun et al. |
| 2021/0020689 | A1 | 1/2021 | Okabe et al. |

FOREIGN PATENT DOCUMENTS

| | | | |
|---|---|---|---|
| EP | 3309190 A1 | 4/2018 | |
| JP | 8507814 A | 8/1996 | |
| JP | 8239448 A | 9/1996 | |
| JP | 2000351828 A | 12/2000 | |
| JP | 2005208603 A | 8/2005 | |
| JP | 2012204254 A | 10/2012 | |
| JP | 2014208839 A | 11/2014 | |
| JP | 2015507658 A | 3/2015 | |
| JP | 2015138612 A | 7/2015 | |
| JP | 2017002202 A | 1/2017 | |
| JP | 2017218522 A | 12/2017 | |
| JP | 2019505412 A | 2/2019 | |
| JP | 2019167429 A | 10/2019 | |
| WO | WO-2017117383 A1 * | 7/2017 | ............. B32B 15/08 |
| WO | 2019180878 A1 | 9/2019 | |

OTHER PUBLICATIONS

International Search Report and Written Opinion for International Application No. PCT/JP2020/000850, dated Feb. 25, 2020, 7 pages.
International Search Report and Written Opinion for International Application No. PCT/IB2020/000850, dated Feb. 9, 2021, 8 pages.
International Preliminary Report on Patentability and Written Opinion for International Application No. PCT/IB2020/000850, issued Apr. 19, 2022, 6 pages.

* cited by examiner

FLAME RETARDANT EPOXY RESIN COMPOSITION

CROSS REFERENCE TO RELATED APPLICATIONS

This is the U.S. National Phase application of PCT/IB2020/000850 filed Oct. 14, 2020, which claims priority from U.S. Provisional Application No. 62/923,223, filed on Oct. 18, 2019, and from U.S. Provisional Application No. 63/082,281, filed on Sep. 23, 2020, the disclosures of each of these applications being incorporated herein by reference in their entireties for all purposes.

FIELD OF THE INVENTION

The present invention relates to a thermosettable epoxy resin compositions, prepregs, and fiber-reinforced composite materials which provides excellent flame-retardance and is suitable for use with modern fast-cure heating systems.

BACKGROUND OF THE INVENTION

Fiber Reinforced Plastic (FRP) materials comprising a reinforcing fiber and a matrix resin (sometimes also referred to as fiber-reinforced composite materials) have excellent mechanical properties, such as stiffness and strength, while being lighter weight than other more traditional materials, and are therefore utilized in a variety of applications such as aircraft, spacecraft, automobiles, rail vehicles, ships, sporting goods, and computers, with the demand continuing to increase overtime. An increasingly common requirement of industrial applications is to have improved flame retardancy without compromising the relative low costs of manufacturing raw materials, and mechanical and thermal performance of the material.

Halogen flame retardants were conventionally used to provide flame retardancy to a variety of materials, FRP included. Examples of halogen flame retardants include halogenated epoxy resins having a halogen such as bromine or chlorine, like tetrabrominated bisphenol A. However, halogen flame retardants are strongly avoided due to the possibility of releasing toxic gases such as halogenated hydrogen and organic halides during the combustion process. As a result, flameproofing methods substituting halogen-based flame retardants, include methods of adding red phosphorus or phosphoric acid ester compounds to a matrix resin, have become mainstream.

However, a method of adding red phosphorus or phosphoric acid ester compounds to a matrix resin has problems such as: 1) a decline in mechanical strength; 2) poor storage stability; 3) red phosphorus or phosphoric acid ester compounds gradually seeping into the environment over a long time period; and 4) red phosphorus and phosphoric acid ester compounds are easily hydrolyzed, so use is difficult in printed circuit boards, electronic materials, etc. in which insulation properties and water resistance are highly demanded.

An additional common halogen-free flameproofing method for resins is the addition of an inorganic flame retardant such as a metal hydroxide. However, when the added amount of inorganic flame retardant is increased, a problem arises in that the mechanical strength of the cured resin declines. The decline in the mechanical strength of a cured resin causes a decline in the mechanical strength of the fiber-reinforced composite material. It is difficult to obtain sufficient flame retardancy with an added amount of inorganic flame retardant on the order that maintains the mechanical strength demanded in the fiber-reinforced composite material.

The present invention has been made taking the above matters into account, and has an object (among others) of providing an epoxy resin composition that can produce, when combined with a reinforcing material and cured, a composite material having superior flame retardance without containing halogen-based flame retardants, red phosphorus, or phosphoric acid ester, and does not rely on the addition of inorganic flame retardants such as metal hydroxides. Additional objects include, but are not limited to, a prepreg containing a matrix of reinforcing fiber impregnated with the aforementioned flame retardant epoxy resin composition, as well as a fiber-reinforced composite material obtained using the prepreg.

SUMMARY OF THE INVENTION

As a result of thorough investigation, the present inventors have found that superior flame retardancy is imparted to an epoxy resin composition by blending specific phosphorus-containing chemicals with specific amounts of specific types of epoxy resin. The resulting flame retardant epoxy resin composition also maintains the mechanical and heat resistance properties of analogous resin compositions which do not include such phosphorus-containing chemicals, provided that adjustments in the formulation are made to maintain the crosslink density of the cured material. Namely, the present invention includes, but is not limited to the following embodiments:

(1) A flame-retardant epoxy resin composition for fiber-reinforced composite material, comprising (or consisting essentially of or consisting of) a component [A], a component [B], and a component [C], wherein:

the flame retardant epoxy resin composition has a phosphorus content of at least 0.5% by weight based on the total weight of the flame retardant epoxy resin composition;

the component [A] is comprised of (or consists essentially of or consists of) at least one low THR multifunctional epoxy resin having a total heat release (THR) value of ≤23 k/g, wherein a total amount of low THR multifunctional epoxy resins is at least 15 PHR or at least 10% by weight of the total weight of the flame retardant epoxy resin composition;

the component [B] is comprised of (or consists essentially of or consists of) at least one organic phosphinic acid; and the component [C] is comprised of (or consists essentially of or consists of) at least one curing agent.

In an embodiment of the flame retardant composition, the at least one organic phosphinic acid includes at least one organic phosphinic acid corresponding to formula (I):

wherein $R^1$ and $R^2$ are independently selected from an alkyl group having from 1 to 10 carbon atoms and an aryl group having from 6 to 10 carbon atoms. In an embodiment, $R^1$ and $R^2$ in formula (I) are each an ethyl group.

In an embodiment, at least a portion of the component [6] is pre-reacted with at least a portion of the low THR multifunctional epoxy resin. In another embodiment, the component [B] is not pre-reacted with the low THR multifunctional epoxy resin.

(2) A flame retardant epoxy resin composition for fiber reinforced composite material comprising (or consisting essentially of or consisting of) a component [C], and an epoxy component selected from:
  (i) a component [A-1],
  (ii) the component [A-1] and a component [A],
  (iii) the component [A] and a component [E],
  (iv) the component [A-1] and the component [E], or
  (v) the component [A-1], the component [A], and the component [E]
wherein:
the flame retardant epoxy resin composition has a phosphorus content of at least 0.5% by weight based on the total weight of the flame retardant epoxy resin composition;
the component [A] is comprised of at least one low THR multifunctional epoxy resin having a total heat release (THR) value of ≤23 kJ/g, wherein a total amount of low THR multifunctional epoxy resins, including component [A] and/or component [A-1], is at least 15 PHR or at least 10% by weight of the total weight of the flame retardant epoxy resin composition;
the component [A-1] is comprised of at least one low THR multifunctional epoxy resin that contains at least one residue of at least one organic phosphinic acid;
the component [E] is comprised of at least one epoxy resin, other than the at least one low THR multifunctional epoxy resin, that contains at least one residue of at least one organic phosphinic acid; and
the component [C] is comprised of at least one curing agent.

Thus, (2) in certain embodiments of the invention includes a flame retardant epoxy resin composition for fiber reinforced composite material further comprises an epoxy resin other than the component [A], the component [A-1], and the component [E].

In an embodiment of the flame retardant composition, the at least one residue of at least one organic phosphinic acid corresponds to formula (II):

(II)

wherein $R^1$ and $R^2$ of formula (11) are independently selected from an alkyl group having from 1 to 10 carbon atoms and an aryl group having from 6 to 10 carbon atoms.

The flame retardant epoxy resin compositions of embodiment (1) may additionally comprise at least one multifunctional epoxy resin other than a low THR multifunctional epoxy resin having a total heat release (THR) value of ≤23 kJ/g.

In an embodiment, the component [E] includes at least one epoxy resin corresponding to formula (III):

(III)

wherein $R^1$ and $R^2$ of formula (III) are independently selected from an alkyl group having from 1 to 10 carbon atoms and an aryl group having from 6 to 10 carbon atoms, and $R^3$ of formula (III) is a residue of a multifunctional epoxy resin in which at least one epoxy group has been reacted to introduce a substituent —O—P(=O)$R^1R^2$ and the at least one epoxy resin corresponding to formula (III) has at least one unreacted epoxy group. In an embodiment, $R^3$ in formula (III) is a residue of at least one tetraglycidyl diaminodiphenyl methane.

The flame retardant epoxy resin compositions of embodiment (2), may additionally comprise at least one multifunctional epoxy resin other than a low THR multifunctional epoxy resin having a total heat release (THR) value of ≤23 kJ/g and other than an epoxy resin that contains the residue of at least one organic phosphinic acid.

In another aspect of the flame retardant compositions, as disclosed hereinabove, all of the low THR multifunctional epoxy resins comprise at least 15 PHR or at least 10% by weight of the total weight of the flame retardant epoxy resin composition. In an embodiment, flame retardant epoxy resin composition may comprise from 15 PHR to 85 PHR of the at least one low THR epoxy resin.

In an aspect of the flame retardant compositions, as disclosed hereinabove, the low THR epoxy resin is comprised of at least one glycidyl amine-type epoxy resin. In an embodiment, the low THR epoxy resins is comprised of at least one tetraglycidyl diaminodiphenyl methane. In another embodiment, the low THR epoxy resin is a glycidyl amine-type epoxy resin.

In another aspect of the flame retardant compositions, as disclosed hereinabove, the epoxy resin composition additionally comprises at least one accelerator. In an embodiment, the at least one accelerator includes at least one aromatic urea. The at least one aromatic urea may be present in the epoxy resin composition in a total amount ranging from 0.5 to 7 PHR. In another embodiment, the at least one curing agent includes at least one dicyandiamide. The at least one dicyandiamide may be present in the epoxy resin composition in a total amount ranging from 3 to 7 PHR.

In another aspect of the flame retardant compositions, as disclosed hereinabove, the epoxy resin composition additionally comprises at least one thermoplastic. In an embodiment, the at least one thermoplastic includes at least one polyvinylformal. In another embodiment, the at least one thermoplastic includes at least one polyethersulfone.

In an aspect of the flame retardant compositions, as disclosed hereinabove, the $R^1$ and $R^2$ in formula (I) are each an ethyl group.

In an aspect, a prepreg comprises a reinforcing fiber matrix impregnated with a flame retardant epoxy resin composition in accordance with embodiment (1), embodiment (2) or both embodiment (1) and embodiment (2) (e.g., the flame retardant epoxy resin composition may include both at least one organic phosphinic acid as in embodiment (1) and at least one epoxy resin that contains at least one residue of at least one organic phosphinic acid as in embodiment (2)). In an embodiment, a fiber-reinforced composite material may be obtained by curing the prepreg. In another embodiment, a method of making a fiber-reinforced composite material, comprises curing a prepreg in at a temperature of from 120° C. to 200° C. in another aspect, a fiber-reinforced composite material comprises a cured epoxy resin product obtained by curing a mixture comprised of a flame retardant epoxy resin composition, as disclosed hereinabove, and a reinforcing fiber.

DETAILED DESCRIPTION OF EMBODIMENTS OF THE INVENTION

Figure 1:
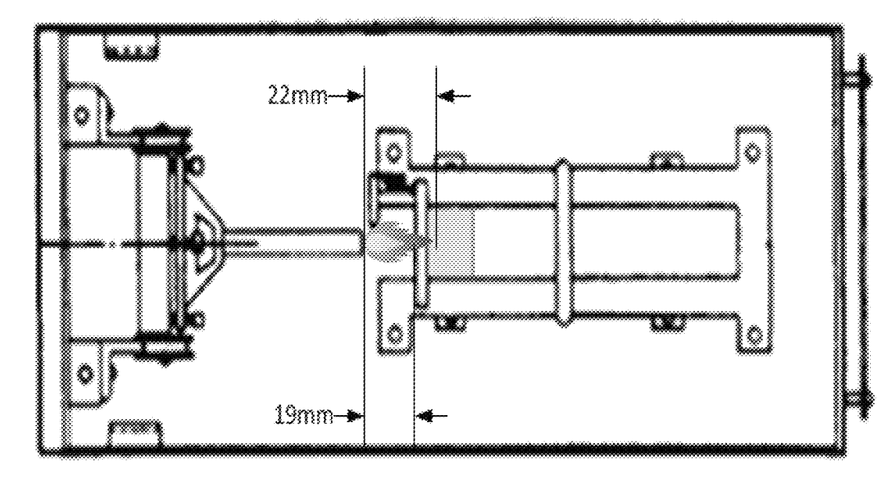
The FIGURE shows the test setup of the neat resin flammability testing inspired by SFI 56.1 specifications, as further described in the Examples.

The terms "approximately", "about" and "substantially" as used herein represent an amount close to the stated amount that still performs the desired function or achieves the desired result. For example, the terms "approximately", "about", and "substantially" may refer to an amount that is within less than 10% of, within less than 5% of, within less than 1% of, within less than 0.1% of, and within less than 0.01% of the stated amount.

The term "room temperature" as used herein has its ordinary meaning as known to those skilled in the art and may include temperatures within the range of about 15° C. to 43° C.

In accordance with the present disclosure, a flame retardant epoxy resin composition for fiber-reinforced composite material comprises a component [A], a component [B], and a component [C], such that the flame retardant epoxy resin composition has a phosphorus content of at least 0.5% by weight based on the total weight of the flame retardant epoxy resin composition. The component [A] is comprised of at least one low THR multifunctional epoxy resin having a total heat release (THR) value of ≤23 kJ/g, wherein a total amount of low THR multifunctional epoxy resins is at least 15 PHR or at least 10% by weight of the total weight of the flame retardant epoxy resin composition. The component [B] is comprised of at least one organic phosphinic acid, and the component [C] is comprised of at least one curing agent. In an embodiment, at least a portion of the component [B] is pre-reacted with at least a portion of the low THR multifunctional epoxy resin of the component [A]. In another embodiment, the component [B] is not pre-reacted with the low THR multifunctional epoxy resin of the component [A].

In an aspect of the flame retardant epoxy resin composition, the composition comprises the component [C] and an epoxy component, where the epoxy component comprises one or more of a component [A], a component [A-1], and a component [E], such that the component [E] must be present either with the component [A] or with the component [A-1] and that the epoxy component must comprise at least one of the component [A-1] and the component [E]. The component [A-1] is comprised of at least one low THR multifunctional epoxy resin that contains at least one residue of at least one organic phosphinic acid. The component [E] is comprised of at least one epoxy resin, other than the at least one low THR multifunctional epoxy resin, that contains at least one residue of at least one organic phosphinic acid. In an embodiment, the flame retardant epoxy resin composition comprises the component [C], and a component [A-1]. In another embodiment, the flame retardant epoxy resin composition comprises the component [A-1] and the component [A]. In yet another embodiment, the flame retardant epoxy resin composition comprises the component [A] and a component [E]. In one embodiment, the flame retardant epoxy resin composition comprises the component [A-1] and the component [E]. In yet another embodiment, the flame retardant epoxy resin composition comprises the component [A-1], the component [A], and the component [E]. Additionally, the flame retardant epoxy resin composition may further comprise an epoxy resin other than the component [A], the component [A-1], and the component [E]. In various embodiments, as disclosed hereinabove, the flame retardant epoxy resin composition has a phosphorus content of at least 0.5% by weight based on the total weight of the flame retardant epoxy resin composition. In some embodiments, a total amount of low THR multifunctional epoxy resins, including component [A] and/or component [A-1], is at least 15 PHR or at least 10% by weight of the total weight of the flame retardant epoxy resin composition.

In various embodiments, the flame retardant epoxy resin compositions of the present disclosure maintain the mechanical and heat resistance properties of analogous epoxy resin based flame retardant compositions which do not include such phosphorus-containing chemicals, provided that adjustments in the formulation are made to maintain the crosslink density of the cured epoxy resin composition.

In an embodiment, the flame retardant epoxy resin compositions are completely free or substantially free of halogen-substituted products, epoxy resins having a fluorene skeleton and halogenated epoxy resins. In other embodiments, the flame retardant compositions may include one or more of halogen-substituted products, epoxy resins having a fluorene skeleton and halogenated epoxy resins in a suitable amount to improve the fire retardancy of the composite material.

Component [B]

In an embodiment of the flame retardant epoxy resin composition, the component [B] is comprised of or consists essentially of or consists of at least one organic phosphinic acid. The organic phosphinic acid employed in the present invention is not particularly limited. Organic phosphinic acids are compounds containing at least one >P(=O)OH functional group wherein the phosphorus atom is additionally substituted by two organic groups (e.g., alkyl and/or aryl groups) which may be the same as or different from each other, wherein a carbon atom in each organic group is directly bonded to the phosphorus atom. Organic phosphinic acids have the general formula $R_2PO_2H$, wherein the two hydrogen atoms directly bound to phosphorus in phosphinic acid ($PO_2H_3$) are replaced by organic groups R. The organic groups R may be hydrocarbon groups, but in certain embodiments may comprise one or more types of atoms in addition to carbon and hydrogen atoms such as N, O, halogen, etc. For example, the organic group(s) may be substituted with a hydroxyl or carboxylic acid group. However, in preferred embodiments, the organic phosphinic acid is halogen-free. Dialkyl phosphinic acids, diaryl phosphinic acids and alkylaryl phosphinic acids, as well as combinations thereof, are all suitable for use in embodiments of the present invention.

According to certain embodiments, the flame retardant epoxy resin composition is comprised of, or is prepared using, one or more organic phosphinic acids corresponding to formula (I):

(I)

wherein $R^1$ and $R^2$ are independently selected from an alkyl group having from 1 to 10 carbon atoms and an aryl group having from 6 to 10 carbon atoms. In an embodiment, $R^1$ and $R^2$ are identical to each other. In another embodiment, $R^1$ and $R^2$ are different from each other. The alkyl group may be linear, branched, and/or alicyclic. Suitable alkyl groups having from 1 to 10 carbon atoms include, but are not limited to methyl, ethyl, n-propyl, isopropyl, iso-octyl, cyclohexyl. Suitable aryl group having from 6 to 10 carbon atoms include, but are not limited to phenyl, tolyl, naphthyl.

Examples of suitable organic phosphinic acids include, but are not limited to: dimethyl phosphinic acid, methylethyl phosphinic acid, diethyl phosphinic acid, dipropyl phosphinic acid, ethyl phenyl phosphinic acid, di(isooctyl) phosphinic acid, diphenyl phosphinic acid, methylbenzyl phosphinic acid, naphthylmethyl phosphinic acid, methylphenyl phosphinic acid and combinations thereof. Diethyl phosphinic acid is particularly preferred for use in embodiment of the present invention.

The flame retardant epoxy resin composition may contain an amount of the organic phosphinic acid(s) in unreacted form, as shown in formula (I) or reacted form, as shown in formula (II) and formula (III), or a mixture of unreacted and reacted form, such that the total phosphorus content is at least 0.5% by weight of the total weight of the flame retardant epoxy resin composition. If the amount of phosphorus is at least 0.5% by weight, the epoxy resin composition, when cured, will pass most flame retardance tests at a specified thickness. In other embodiments, the phosphorus content can be greater than 1.5% to impart a level of fire retardancy to the cured epoxy resin composition that will be sufficient to pass most testing specifications even with very thin specimens. Typically, the epoxy resin composition need not contain more than 5% by weight phosphorus in order to achieve satisfactory flame retardancy for most purposes and end use applications. Moreover, if the phosphorus content is increased without making appropriate adjustments in the crosslink density, the mechanical performance of the cured epoxy resin composition may be reduced. In certain embodiments, all or nearly all of the phosphorus content in the flame retardant epoxy resin composition is attributable to one or more organic phosphinic acids and/or organic phosphinic acid-modified epoxy resins as described herein, although other types of phosphorus-containing compounds could also be present in addition to organic phosphinic acid(s) and/or organic phosphinic acid-modified epoxy resin(s). According to certain embodiments, at least 70%, at least 75%, at least 80%, at least 85%, at least 90%, at least 95% or at least 99% or 100% of the phosphorus content of the flame retardant epoxy resin composition is contributed by the organic phosphinic acid(s) and/or organic phosphinic acid-modified epoxy resin(s).

<Epoxy Resins>: Component [A] and Other Epoxy Resins (Other than the Component [A], the Component [A-1], and the Component [E])

In an embodiment of the flame retardant epoxy resin composition, the component [A] is comprised of or consists essentially of or consists of the component [A] of at least one low THR multifunctional epoxy resin having a total heat release (THR) value of ≤23 kJ/g, wherein a total amount of low THR multifunctional epoxy resins is at least 15 PHR or at least 10% by weight of the total weight of the flame retardant epoxy resin composition. In an embodiment, the flame retardant epoxy resin composition may further comprises at least one multifunctional epoxy resin other than a low THR multifunctional epoxy resin having a total heat release (THR) value of ≤23 kJ/g of component [A]. In yet another embodiment, the flame retardant epoxy resin composition may comprise an epoxy resin other than the component [A], the component [A-1], and the component [E].

In an embodiment, the low THR epoxy resin is comprised of at least one glycidyl amine-type epoxy resin. As used herein, the glycidyl amine-type epoxy resin is an epoxy resin having at least one glycidyl amino group and/or diglycidyl amino group. Examples of suitable glycidyl amine-type epoxy resin include tetraglycidyl diaminodiphenylmethane, a glycidyl compound of xylenediamine, triglycidyl aminophenol (triglycidyl-p-aminophenol, triglycidyl-m-aminophenol, etc.), tetraglycidyl diaminodiphenylsulfone, tetraglycidyl diaminodiphenylether, tetraglycidyl bisaminomethylcyclohexanone, diglycidyltoluidine, diglycidylaniline, diglycidylmethoxyaniline, diglycidyldimethyl aniline, diglycidyl trifluoromethyl aniline, diglycidyl-p-phenoxyaniline, etc.

Suitable epoxy resins may be prepared from precursors such as amines (e.g., epoxy resins prepared using diamines and compounds containing at least one amine group and at least one hydroxyl group such as tetraglycidyl diaminodiphenyl methane, tetraglycidyl diaminodiphenylether, tetraglycidyl diaminodiphenylsulfone, tetraglycidyl diaminodiphenylamide, triglycidyl-p-aminophenol, triglycidyl-m-aminophenol, triglycidyl aminocresol and tetraglycidyl xylylenediamine and halogen-substituted products, alkynol-substituted products, hydrogenated products thereof and so on), phenols (e.g., bisphenol A epoxy resins, bisphenol F epoxy resins, bisphenol S epoxy resins, bisphenol R epoxy resins, phenol-novolac epoxy resins, cresol-novolac epoxy resins, resorcinol epoxy resins and triphenlymethane epoxy resins), naphthalene epoxy resins, dicyclopentadiene epoxy resins, epoxy resins having a biphenyl skeleton, isocyanate-modified epoxy resins, epoxy resins having a fluorene skeleton and compounds having a carbon-carbon double bond (e.g., alicyclic epoxy resins). It should be noted that the epoxy resins are not restricted to the examples above. Halogenated epoxy resins prepared by halogenating these epoxy resins can also be used. Furthermore, mixtures of two or more of these epoxy resins, and compounds having one epoxy group or monoepoxy compounds such as glycidylaniline, glycidyl toluidine or other glycidylamines (particularly glycidylaromatic amines) can be employed in the formulation of the flame retardant epoxy resin composition. When the flame retardant epoxy resin composition is to be used to prepare a prepreg or a fiber-reinforced composite material, however, it typically will be desirable to limit the amount of mono-functional epoxy resin, to, for example, no more than 20, no more than 15, no more than 10, or no more than 5 PHR mono-functional epoxy resin.

In an embodiment, the flame retardant epoxy resin compositions are completely free or substantially free of halogen-substituted products, epoxy resins having a fluorene skeleton and halogenated epoxy resins. In other embodiments, the epoxy resins may include one or more of halogen-substituted products, epoxy resins having a fluorene skeleton and halogenated epoxy resins in a suitable amount to improve the fire retardancy of the material.

Examples of tetraglycidyl diaminodiphenyl methane resins which are commercially available products include "Sumi-epoxy (registered trademark)" ELM434 (manufactured by Sumitomo Chemical Co., Ltd.), YH434L (manufactured by Nippon Steel Chemical Co., Ltd.), "jER (registered trademark)" 604 (manufactured by Mitsubishi Chemical Corporation), and "Araldite (registered trademark)" MY720, MY721, MY9655 and MY9655T (which are manufactured by Huntsman Advanced Materials).

Examples of tetraglycidyl diaminodiphenylsulfones which are commercially available products include TG3DAS (manufactured by Konishi Chemical Ind. Co., Ltd.).

Examples of triglycidyl aminophenol or triglycidyl aminocresol resins which are commercially available products include "Sumi-epoxy (registered trademark)" ELM100 (manufactured by Sumitomo Chemical Co., Ltd.), "Araldite (registered trademark)" MY0500, MY0510, MY0600 and MY0610 (which are manufactured by Huntsman Advanced Materials) and "jER (registered trademark)" 630 (manufactured by Mitsubishi Chemical Corporation).

Examples of tetraglycidyl xylylenediamine and hydrogenated products thereof which are commercially available products include TETRAD-X and TETRAD-C (which are manufactured by Mitsubishi Gas Chemical Company, Inc.).

Examples of bisphenol A epoxy resins which are commercially available include "jER (registered trademark)" 825, "jER (registered trademark)" 828, "jER (registered trademark)" 834, "jER (registered trademark)" 1001, "jER (registered trademark)" 1002, "jER (registered trademark)" 1003, "jER (registered trademark)" 1003F, "jER (registered trademark)" 1004, "jER (registered trademark)" 1004AF, "jER (registered trademark)" 1005F, "jER (registered trademark)" 1006FS, "jER (registered trademark)" 1007, "jER (registered trademark)" 1009 and "jER (registered trademark)" 1010 (which are manufactured by Mitsubishi Chemical Corporation). Examples of brominated bisphenol A epoxy resins which are commercially available include "jER (registered trademark)" 505, "jER (registered trademark)" 5050, "jER (registered trademark)" 5051, "jER (registered trademark)" 5054 and "jER (registered trademark)" 5057 (which are manufactured by Mitsubishi Chemical Corporation). Examples of hydrogenated bisphenol A epoxy resins which are commercially available products include ST5080, ST4000D, ST4100D and ST5100 (which are manufactured by Nippon Steel Chemical Co., Ltd.).

Examples of bisphenol F epoxy resins which are commercially available products include "jER (registered trademark)" 806, "jER (registered trademark)" 807, "jER (registered trademark)" 4002P, "jER (registered trademark)" 4004P, "jER (registered trademark)" 4007P, "jER (registered trademark)" 4009P and "jER (registered trademark)" 4010P (which are manufactured by Mitsubishi Chemical Corporation), and "Epotohto (registered trademark)" YDF2001 and "Epotohto (registered trademark)" YDF2004 (which are manufactured by Nippon Steel Chemical Co., Ltd.). An example of a tetramethyl-bisphenol F epoxy resin which is a commercially available product is YSLV-80XY (manufactured by Nippon Steel Chemical Co., Ltd.).

An example of a bisphenol S epoxy resin which is a commercially available product is "EPICLON (registered trademark)" EXA-154 (manufactured by DIC Corporation).

Examples of phenol-novolac epoxy resins which are commercially available products include "jER (registered trademark)" 152 and "jER (registered trademark)" 154 (which are manufactured by Mitsubishi Chemical Corporation), "Araldite (registered trademark)" EPN1138 (which are manufactured by Huntsman Advanced Materials) and "EPICLON (registered trademark)" N-740, N-770 and N-775 (which are manufactured by DIC Corporation).

Examples of cresol-novolac epoxy resins which are commercially available products include "EPICLON (registered trademark)" N-660, N-665, N-670, N-673 and N-695 (which are manufactured by DIC Corporation), and EOCN-1020, EOCN-102S and EOCN-104S (which are manufactured by Nippon Kayaku Co., Ltd.).

An example of a resorcinol epoxy resin which is commercially available is "Denacol (registered trademark)" EX-201 (manufactured by Nagase chemteX Corporation).

Examples of naphthalene epoxy resins which are commercially available products include "EPICLON (registered trademark)" HP-4032, HP-4032D, HP-4700, HP-4710, HP-4770, EXA-4701, EXA-4750, EXA-7240 (which are manufactured by DIC Corporation).

Examples of triphenylmethane epoxy resins which are commercially available products include "jER (registered trademark)" 1032550 (which are manufactured by Mitsubishi Chemical Corporation), "Tactix (registered trademark)" 742 (manufactured by Huntsman Advanced Material) and EPPN-501H (which are manufactured by Nippon Kayaku Co., Ltd.).

Examples of dicyclopentadiene epoxy resins which are commercially available products include "EPICLON (registered trademark)" HP-7200, HP-7200L, HP-7200H and HP-7200HH (which are manufactured by DIC Corporation), "Tactix (registered trademark)" 558 (manufactured by Huntsman Advanced Material), and XD-1000-1L and XD-1000-2L (which are manufactured by Nippon Kayaku Co., Ltd.).

Examples of epoxy resins having a biphenyl skeleton which are commercially available products include "jER (registered trademark)" YX4000H, YX4000 and YL6616 (which are manufactured by Mitsubishi Chemical Corporation), and NC-3000 (manufactured by Nippon Kayaku Co., Ltd.).

Examples of isocyanate-modified epoxy resins which are commercially available products include AER4152 (manufactured by Asahi Kasei Epoxy Co., Ltd.) and ACR1348 (manufactured by ADEKA Corporation), each of which has an oxazolidone ring.

Examples of epoxy resins having a fluorene skeleton which are commercially available products include OGSOL PG-100, CG-200 and EG-200 (which are manufactured by Osaka Gas Chemicals Co., Ltd) and LME10169 (manufactured by Huntsman Advanced Material).

Examples of glycidylanilines which are commercially available products include GAN (manufactured by Nippon Kayaku Co., Ltd.).

Examples of commercially available products of glycidyl toluidine include GOT (manufactured by Nippon Kayaku Co., Ltd.).

The epoxy resin component(s) of the flame retardant epoxy resin composition may contain, or may be based upon following modification with organic phosphinic acid), triglycidyl aminophenol, triglycidyl aminocresol, tetraglycidyl amines, phenol-novolac epoxy resins, cresol-novolac epoxy resins, resorcinol epoxy resins, naphthalene epoxy resins, dicyclopentadiene epoxy resins, epoxy resins having a biphenyl skeleton, isocyanate-modified epoxy resins, alicyclic epoxy resins, triphenylmethane epoxy resins and epoxy resins having a fluorene skeleton resins, each of which can help to contribute high heat resistance in the cured epoxy resin composition.

The epoxy resin component(s) may also contain, or may be based upon, triglycidyl aminophenol, triglycidyl aminocresol, tetraglycidyl amines, naphthalene epoxy resins, epoxy resins having a biphenyl skeleton, isocyanate-modified epoxy resins, alicyclic epoxy resins, triphenylmethane epoxy resins and epoxy resins having a fluorene skeleton, each of which can help to contribute to both high heat resistance and mechanical properties once the epoxy resin composition is cured.

In certain embodiments of the present invention, when the flame retardant epoxy resin composition is cured, a burn time of the cured resin is less than 10 seconds, other embodiments not more than 5 seconds and still other embodiments not more than 3 seconds, as determined by a flammability test modified from the SFI 56.1 flammability test specification for application to neat resin specimens. When the burn time is less than 10 seconds we can see a good correlation more easily to the parameters of flammability testing fiber-reinforced composite materials. (described in more detail in the Example section).

In certain embodiments of the present invention, when the flame retardant epoxy resin composition is cured, a burn length of the cured resin is not more than 0.7 inches, in other embodiments not more than 0.5 inches and still other embodiments not more than 0.3 inches, as determined by the flammability test modified from the SFI 56.1 flammability test specification for application to neat resin specimens. When the burn time is less than 10 seconds we can see a good correlation more easily to the parameters of flammability testing fiber-reinforced composite materials. (described in more detail in the Example section).

The epoxy resin component(s) may also contain, or may be based upon, triglycidyl aminophenol, triglycidyl aminocresol and tetraglycidyl amines, each of which can help to contribute (when cured) to high heat resistance, mechanical properties and provides a fiber-reinforced composite material of surface quality which is comprised of the epoxy resin composition and a reinforcing fiber.

In an embodiment, a first bisphenol epoxy resin may be contained in the flame retardant epoxy resin composition and is not particularly limited, if it is a material which is an epoxidized bisphenol.

Surprisingly, it was found that when testing the flammability of cured epoxy resin compositions, the ones that contained at least one epoxy resin with a THR less than or equal to 23 kJ/g had superior flammability resistance when the amount of this type of epoxy resin was at least 15 PHR (i.e., the epoxy resin composition contained at least 15 parts by weight of low THR epoxy resin per 100 parts by weight of total epoxy resin) or at least 10% of the total weight of the flame retardant epoxy resin composition, as compared to the flammability resistance of analogous compositions not containing a low THR epoxy resin less than 15 PHR or less than 10% by weight in total of low THR epoxy resin. According to certain embodiments, the epoxy resin composition contains at least 15 PHR and at least 10% by weight of low THR epoxy resin (either a single low THR epoxy resin or a combination or two or more low THR epoxy resins).

Not to be bound by theory, it is thought that the lower heat release of the epoxy resin reduces the ability of the flame to propagate across the part fabricated from the epoxy resin composition, giving the phosphorus from the organic phosphinic acid or organic phosphinic acid-modified epoxy resin opportunity to react with oxygen in the atmosphere to create both a crosslinked char layer and a water barrier to extinguish the flame. This allows the test specimen to pass flammability testing with a lower percentage of total phosphorus content, as compared to conventional flame retardant epoxy resin compositions based on phosphorus-containing compounds. The lower phosphorus content in the flame retardant epoxy resin composition allows more freedom to adjust the formulation for different properties such as better toughness, higher Tg and higher modulus.

According to other embodiments, the flame retardant epoxy resin composition may be comprised of at least 15%, at least 20%, at least 25%, or at least 30% of low THR epoxy resin in total, based on the total weight of the flame retardant epoxy resin composition.

According to other embodiments, the flame retardant epoxy resin composition may be comprised of at least 20 PHR, at least 25 PHR, at least 30 PHR, or at least 35 PHR of low THR epoxy resin in total. All of the epoxy resin present in the flame retardant epoxy resin composition may be low THR epoxy (i.e., the amount of low THR epoxy resin may be 100 PHR). In other embodiments, one or more high THR epoxy resins (i.e., epoxy resins having a total heat release (THR) value of greater than 23 kJ/g, herein referred to as "high THR epoxy resins") may be present in combination with the low THR epoxy resin(s). For example, the flame retardant epoxy resin composition may be comprised of 15 PHR to 85 PHR of at least one low THR epoxy resin, with the balance of the epoxy resin being one or more high THR epoxy resins (i.e., the flame retardant epoxy resin composition may comprise 15 PHR to 85 PHR high THR epoxy resin).

In the present invention, the epoxy resin(s) having a Total Heat Release (THR) less than or equal to 23 kJ/g is/are not particularly limited and can be any one of a multifunctional epoxy resin provided the aforementioned THR feature is met. The epoxy resin having a Total Heat Release (THR) less than or equal to 23 kJ/g can be chosen from any one of the above epoxy resins as long as it has a THR less than or equal to 23 kJ/g and has a functionality (number of epoxy groups per molecule) of at least 2. Such an epoxy resin is referred to herein as a "low THR epoxy resin." The THR is determined by curing an individual epoxy resin in combination with diamino diphenyl sulfone mixed at a 1:1 EEW (Epoxy Equivalent Weight) to AEW (Amine Equivalent Weight) ratio. This cured specimen is then machined to a size of 100 mm×100 mm×3 mm and tested via one calorimeter with external heat flux set at 50 kW/m$^2$ for Heat Release Rate (HRR per ISO 5660-1). THR is calculated by integrating the HRR data over time.

Examples of epoxy resins with a THR less than or equal to 23 kJ/g include, but are not limited to, tetraglycidyl diaminodiphenyl methane, triglycidyl-p-aminophenol, and mono or bis naphthalene epoxy resins with a functionality of at least two.

According to other embodiments, the THR is preferably less than or equal to 22 kJ/g and more preferably less than or equal to 21.4 kJ/g. Also, the lower limit of THR is preferably not less than 15 kJ/g, more preferably not less than 17 kJ/g, particularly preferably not less than 19 kJ/g and more particularly preferably not less than 19.3 kJ/g.

According to other embodiments, the flame retardant epoxy resin composition preferably has a viscosity at 40° C. of from $1.0 \times 10^2$ to $1.0 \times 10^5$ poise. It is possible to obtain a prepreg having an appropriate cohesiveness by setting the viscosity at 40° C. to $1.0 \times 10^2$ poise or more, and it is possible to impart appropriate drape property and tackiness when laminating the prepreg by setting the viscosity at 40° C. to $1.0 \times 10^5$ poise or less. The viscosity at 40° C. is more preferably in the range of $1.0 \times 10^3$ to $5.0 \times 10^4$ poise, particularly preferably in the range of $5.0\times10^3$ to $2.0\times10^4$ poise and more particularly preferably in the range of $7.0\times10^3$ to $1.0\times10^4$ poise.

According to other embodiments, the minimum viscosity of the flame retardant epoxy resin composition is preferably 0.1 to 200 poise, more preferably 0.5 to 100 poise, and particularly preferably 1 to 50 poise. If the minimum viscosity is too low, the flow of the matrix resin might be too high so resin might be discharged out of the prepreg during prepreg curing. Furthermore, there is a possibility that the desired resin fraction might not be achieved for the fiber reinforced composite material obtained, the flow of the matrix resin in the prepreg might be insufficient, the consolidation process of the prepreg might terminate prematurely, and that many voids might occur in the fiber reinforced composite material obtained. If the minimum viscosity is too high, there is a possibility that the flow of the matrix resin in the prepreg might be low, the consolidation process of the prepreg might terminate prematurely, and many voids might occur in the fiber reinforced composite material obtained.

Herein, the viscosity 40° C. and the minimum viscosity are determined by the following method. Namely, measurements are performed using a 40 mm diameter parallel plate rheometer (ARES, manufactured by TA Instruments) with a gap of 0.6 mm. Torsional displacement is applied at 10 rad/s. The temperature is increased at 2° C./min from 40° C. to 180° C. until the minimum viscosity of the resin was determined.

Adducts of Organic Phosphinic Acid with Epoxy Resin(s)

As used herein, the component [A-1] refers to an adduct of an organic phosphinic acid and a low THR multifunctional epoxy resin. In particular, the component [A-1] refers to a low THR multifunctional epoxy resin that contains at least one residue of at least one organic phosphinic acid including residues of any of the above-mentioned organic phosphinic acids). As used herein, the component [E] refers to an adduct of an organic phosphinic acid and an epoxy resin, other than the at least one low THR multifunctional epoxy resin. In particular, component [E] refers to an epoxy resin, other than the at least one low THR multifunctional epoxy resin, that contains at least one residue of at least one organic phosphinic acid (including residues of any of the above-mentioned organic phosphinic acids).

In certain embodiments of the invention, the flame retardant epoxy resin composition contains a component [E] comprising, consisting essentially of or consisting of a component [C] and one or more of the component [A-1] or the component [E], such that the component [E] must be present either with the component [A] or with the component [A-1].

Such a residue corresponds to an organic phosphinic acid that has reacted with, and therefore become incorporated into, an epoxy resin. Such epoxy resin further contains at least one epoxy group and may be regarded as an organic phosphinic acid-modified epoxy resin or an adduct of an organic phosphinic acid and a multifunctional epoxy resin. An epoxy resin useful as the component [E] or component [A-1] in the present invention may be obtained by reacting an organic phosphinic acid with a multifunctional epoxy resin, other than or a low THR multifunctional epoxy resin respectively, the stoichiometry being controlled such that one or more epoxy groups of the multifunctional epoxy resin remain unreacted. In the course of such reaction, the acid group of the organic phosphinic acid may ring-open an epoxy group of the starting multifunctional epoxy resin.

For example, the at least one residue of at least one organic phosphinic acid may correspond to formula (11):

(II)

wherein $R^1$ and $R^2$ of formula (II) are independently selected from an alkyl group having from 1 to 10 carbon atoms and an aryl group having from 6 to 10 carbon atoms.

In certain embodiments of the invention, the component [E] or the component [A-1] may include at least one epoxy resin corresponding to formula (III):

(III)

wherein $R^1$ and $R^2$ of formula (III) are independently selected from an alkyl group having from 1 to 10 carbon atoms and an aryl group having from 6 to 10 carbon atoms, and $R^1$ of formula (III) is a residue of a multifunctional epoxy resin in which at least one epoxy group has been reacted to introduce a substituent —O—P(=O)$R^1R^2$ and wherein the at least one epoxy resin corresponding to formula (III) has at least one unreacted epoxy group.

Thus, in certain embodiments of the invention, any one of the multifunctional epoxy resin structures present in the flame retardant epoxy resin composition contains at least one organic phosphinic acid residue, where one or more of the multi-functional epoxy resin's reactive sites (e.g., sites where epoxy groups were originally present) are occupied by the structure of formula (II) and at least one epoxy group of the starting multifunctional epoxy resin remains unreacted and thus is free to react when the flame retardant epoxy resin composition is cured.

As an illustrative and nonlimiting example, a multifunctional epoxy resin which is a diglycidyl ether of bisphenol A may be reacted with one equivalent of diethyl phosphinic acid to yield an organic phosphinic acid-modified epoxy resin useful as (or in) component [E] of the present invention:

wherein Ar=arylene and GE=glycidyl ether. Any suitable arylene may be used, such as a benzene ring.

Similarly, a low THR multifunctional epoxy resin may be reacted with one equivalent of diethyl phosphinic acid to yield an organic phosphinic acid-modified low THR multifunctional epoxy resin useful as (or in) component [A-1] of the present invention.

The at least one epoxy resin that contains at least one residue of at least one organic phosphinic acid may, in certain embodiments, be pre-formed prior to formulating the flame retardant epoxy resin composition by carrying out an initial reaction between one or more organic phosphinic acids and one or more multifunctional epoxy resins. Such a pre-reaction may, for example, be performed by blending these components to form a mixture and heating the mixture at a temperature and for a time effective to achieve the desired degree of reaction between the organic phosphinic acid(s) and the multifunctional epoxy resin(s). Such heating may be conducted while stirring or otherwise agitating the mixture. Suitable reaction temperatures may include, for example, a temperature of 50° C. to 150° C. Suitable reaction times may include, for example, a reaction time of 0.1 to 5 hours. Depending upon the stoichiometry selected, a portion of the multifunctional epoxy resin may remain unreacted such that the reaction product obtained and then used in the flame retardant epoxy resin composition is a mixture of an organic phosphinic acid-modified epoxy resin and a multifunctional epoxy resin that does not contain any organic phosphinic acid residues.

Alternatively, the organic phosphinic acid(s) and multifunctional epoxy resin(s) may undergo reaction in the presence of one or more additional components of the flame retardant epoxy resin composition after the flame retardant epoxy resin composition has been partially or fully formulated (for example, either before or during curing of the flame retardant epoxy resin composition).

The above-described embodiment (wherein at least one epoxy resin that contains at least one residue of at least one organic phosphinic acid is present in the flame retardant epoxy resin composition) allows for specific types of flame retardant epoxy resin compositions to be made by controlling the reaction of the organic phosphinic acid with specific epoxy resins and at different amounts. Choosing the type of epoxy resin allows different formulations to be adjusted for toughness, glass transition temperature (Tg), and modulus. For example, with a multifunctional epoxy resin with a functionality of 4, the organic phosphinic acid can be reacted at a 1:4, 2:4, and 3:4 organic phosphinic acid to epoxy equivalent ratio.

In certain embodiments of the present invention, where the flame retardant epoxy resin composition comprises the component [A-1] or the component [E], the multifunctional epoxy resin has at least three or more functionality (i.e., three or more epoxy groups per molecule). When the multifunctional epoxy resin has a functionality of three or more, it allows (following reaction with the organic phosphinic acid) for at least two of the epoxy groups to self-polymerize with each other or with the at least one curing agent allowing for good crosslink density. In other embodiments of the present invention, the multifunctional epoxy resin has a functionality of 4 or more, which can provide the benefits of increasing the crosslink density and improving properties such as Tg. In still other embodiments of the present invention, the multifunctional epoxy resin is a glycidyl amine epoxy resin. In still other embodiments of the present invention, the multifunctional epoxy resin is a tetraglycidyl diaminodiphenyl methane. When the multifunctional epoxy resin is a tetraglycidyl diaminodiphenyl methane, a high Tg can be maintained for the epoxy resin composition when cured.

In some embodiments, when the flame retardant epoxy resin composition is cured, the glass transition temperature of the cured resin is at least 100° C., in other embodiments at least 110° C., still other embodiments at least 125° C. and to still further embodiments at least 140° C., as determined by the G' onset method (described in more detail in the Examples). When the flame retardant epoxy resin has a Tg greater than 100° C. the cured fiber-reinforced composite material part can resist deformation at higher temperatures and have a greater service temperature to broaden its use.

In some embodiments, when the flame retardant epoxy resin composition is cured to provide a cured resin having a flexural modulus of elasticity, the flexural modulus of elasticity of the cured matrix at 25° C. is at least 3.0 GPa, in other embodiments at least 3.4 GPa and still other embodiments at least 3.8 GPa. When the flame retardant resin has a modulus greater than 3.0 GPa at 25° C. the fiber-reinforced composite material part can high compression strength further broaden the material for more structural applications.

In the present invention, the type or types of epoxy resin is/are not particularly limited as long as the effect of the invention is not deteriorated. Di-functional and higher functional epoxy resins and mixtures thereof could be used as the epoxy resin. It is also possible for the flame retardant epoxy resin composition to contain at least some amount of monofunctional epoxy resin, in addition to one or more multifunctional epoxy resins (i.e., epoxy resins containing two or more reactive epoxy groups per molecule).

In embodiments where the epoxy resin composition comprises the component [A-1], i.e., at least one low THR multifunctional epoxy resin that contains at least one residue of at least one organic phosphinic acid (an organic phosphinic acid-modified epoxy resin), such organic phosphinic acid-modified low THR epoxy resin(s) may be the only epoxy resin(s) present in the epoxy resin composition. However, the epoxy resin composition could also contain one or more additional epoxy resins which are not organic phosphinic acid-modified epoxy resins (i.e., epoxy resins that do not contain any organic phosphinic acid residues), such as component [A] or epoxies other than the component [A], the component [A-1], and the component [E].

In embodiments where the epoxy resin composition comprises the component [E], i.e., at least one epoxy resin that contains at least one residue of at least one organic phosphinic acid (an organic phosphinic acid-modified epoxy resin), such organic phosphinic acid-modified epoxy resin(s) must be present with the component [A] and/or the component [A-1]. Additionally, the epoxy resin composition could also contain one or more additional epoxy resins which are not organic phosphinic acid-modified epoxy resins (i.e., epoxy resins that do not contain any organic phosphinic acid residues).

Component [C]: Curing Agent

In certain embodiments of the present invention, a dicyandiamide is used as a curing agent. If the dicyandiamide is used as a curing agent, the uncured epoxy resin composition has high storage stability and the cured epoxy resin composition has high heat resistance.

The amount of the dicyandiamide may be in range of 3 to 7 PHR per 100 PHR of total epoxy resin (wherein "PHR" is parts per hundred parts resin, such that the dicyandiamide is present in the flame retardant epoxy resin composition in an amount which is from 3 parts by weight to 7 parts by weight per 100 parts by weight of the total amount of epoxy resin). If the amount of the dicyandiamide is at least 3 PHR, the cured epoxy resin composition may have high heat resistance. If the amount of the dicyandiamide is no more than 7 PHR, the cured epoxy resin composition may have high elongation.

Examples of dicyandiamide which are commercially available products include DICY-7 and DICY-15 (which are manufactured by Mitsubishi Chemical Corporation) and "Dyhard (registered trademark)" 100S (manufactured by AlzChem Trostberg GmbH).

In other embodiments of the present invention, any curing agent other than the dicyandiamide may be included or added, as long as the effect of the invention is not deteriorated. Examples of suitable curing agents include, but are not limited to, polyamides, amidoamines (e.g., aromatic amidoamines such as aminobenzamides, aminobenzanilides, and aminobenzenesulfonamides), aromatic diamines (e.g., diaminodiphenylmethane, diaminodiphenylsulfone [DDS]), aminobenzoates (e.g., trimethylene glycol di-p-aminobenzoate and neopentyl glycol di-p-amino-benzoate), aliphatic amines (e.g., triethylenetetramine, isophoronediamine), cycloaliphatic amines (e.g., isophorone diamine), imidazole derivatives, guanidines such as tetramethylguanidine, carboxylic acid anhydrides (e.g., methylhexahydrophthalic anhydride), carboxylic acid hydrazides (e.g., adipic acid hydrazide), phenol-novolac resins and cresol-novolac resins, carboxylic acid amides, polyphenol compounds, polysulfides and mercaptans, and Lewis acids and bases (e.g., boron trifluoride ethylamine, tris-(diethylaminomethyl) phenol). Furthermore, at least one curing agent selected from these curing agents may be used and combinations of two or more of such curing agents or combinations of one or more of such curing agents together with a dicyandiamide could also be employed.

Accelerator

In certain embodiments of the present invention, at least one aromatic urea is used as an accelerator for a reaction of an epoxy resin with a curing agent and/or self-polymerization of epoxy resin. In some embodiments, a combination of aromatic ureas may be used. If at least one aromatic urea is used as the accelerator, the epoxy resin composition has high storage stability and the cured epoxy resin composition has high heat resistance.

The amount of at least one aromatic urea may be in the range of 0.5 to 7 PHR per 100 PHR of total epoxy resin (i.e., from 0.5 parts by weight aromatic urea per 100 parts by weight of the total amount of epoxy resin to 7 parts by weight aromatic urea per 100 parts by weight of the total amount of epoxy resin). If the amount of the at least one aromatic urea is at least 0.5 PHR, the cured epoxy resin composition may have high heat resistance. If the amount of the aromatic urea is no more than 7 PHR, the epoxy resin composition has high storage stability.

Examples of suitable aromatic ureas include N, N-dimethyl-N'-(3, 4-dichlorophenyl) urea, toluene bis (dimethylurea), 4, 4'-methylene bis (phenyl dimethylurea), and 3-phenyl-1, 1-dimethylurea and combinations thereof. Examples of aromatic urea which are commercially available products include DCMU99 (manufactured by Hodogaya Chemical Co., Ltd.), and "Omicure (registered trademark)" U-24, U-24M, U-52, U-52M, and 94 (which are manufactured by Huntsman Advanced Material). Among these, aromatic ureas having more than one urea group may be used in in order to promote rapid curing properties In other embodiments of the present invention, any accelerator other than an aromatic urea or in addition to an aromatic urea may be added, as long as the effect of the invention is not deteriorated. Examples of such accelerators include, but are not limited to, sulfonate compounds, boron trifluoride piperidine, p-t-butylcatechol, sulfonate compounds (e.g., ethyl p-toluenesulfonate or methyl p-toluenesulfonate), tertiary amines and salts thereof, imidazoles and salts thereof, phosphorus curing accelerators, metal carboxylates and Lewis and Bronsted acids and salts thereof.

Examples of imidazole compounds or derivatives thereof which are commercially available include "Curezol (registered trademark)" 2MZ, 2PZ and 2E4MZ (which are manufactured by Shikoku Chemicals Corporation). Examples of a Lewis acid catalyst include complexes of a boron trihalide and a base, such as boron trifluoride piperidine complex, boron trifluoride monoethyl amine complex, boron trifluoride triethanol amine complex, boron trichloride octyl amine complex, methyl p-toluenesulfonate, ethyl p-toluenesulfonate and isopropyl p-toluenesulfonate.

Thermoplastics

For certain embodiments of the present invention, any thermoplastic (i.e., a polymer or resin which is thermoplastic in nature) may be included in the flame retardant epoxy resin composition, as long as the effect of the invention is not deteriorated. Examples of suitable thermoplastics include thermoplastics that are soluble in an epoxy resin as well as thermoplastics that are insoluble in an epoxy resin and that may be in the form of particles (i.e., thermoplastic particles. Other types of organic particles, such as rubber particles (including crosslinked rubber particles), could also be included in the flame retardant epoxy resin composition.

As the thermoplastic that is soluble in an epoxy resin, a thermoplastic having a hydrogen-binding functional group which is expected to have an effect of improving the adhesion between an epoxy resin composition and a reinforcing fiber may be used. Examples of thermoplastics which are soluble in an epoxy resin and have a hydrogen-binding functional group include thermoplastics having alcoholic hydroxy groups, thermoplastics having amide bonds, and thermoplastics having sulfonyl groups.

Examples of thermoplastics having hydroxyl groups include polyvinyl acetal resins such as polyvinyl formal and polyvinyl butyral, polyvinyl alcohols and phenoxy resins. Examples of thermoplastics having amide bonds include polyamides, polyimides and polyvinyl pyrrolidones. An example of a thermoplastic having sulfonyl groups is polysulfone. The polyamides, the polyimides and the polysulfones may have a functional group such as an ether bond and/or a carbonyl group in the main chain thereof. For example, the thermoplastic may be a polyethersulfone. The polyamides may have a substituent on a nitrogen atom in the amide group.

Examples of commercially available thermoplastics soluble in an epoxy resin and having hydrogen-binding functional groups include: "Denkabutyral (registered trademarks)" and "Denkaformal (registered trademarks)" (which are manufactured by Denki Kagaku Kogyo Kabushiki Kaisha) and "Vinylec (registered trademark)" (manufactured by JNC Corporation) which are polyvinyl acetal resins; "UCAR (registered trademark)" PKHP (manufactured by Union Carbide Corporation) which is a phenoxy resin; "Macromelt (registered trademark)" (manufactured by Henkel-Hakusui Corporation) and "Amilan (registered trademark)" CM4000 (manufactured by Toray Industries Inc.) which are polyamide resins; "Ultem (registered trademark)" (manufactured by General Electric Co., Ltd.) and "Matrimid (registered trademark)" 5218 (manufactured by Ciba Inc.) which are polyimides; "Sumikaexcel (registered trademark)" (manufactured by Sumitomo Chemical Co., Ltd.) and "UDEL (registered trademark)" (manufactured by Solvay Advanced Polymers Kabushiki Kaisha) which are polysulfones; and "Luviskol (registered trademark)" (manufactured by BASF Japan Ltd.) which is polyvinyl pyrrolidone.

Other Additives

Flame retardant epoxy resin compositions in accordance with certain embodiments of the invention may include one or more acrylic resins. The acrylic resin may have high incompatibility with an epoxy resin, and therefore may be used suitably for controlling viscoelasticity. Examples of commercially available products of such acrylic resins include "Dianal (registered trademark)" BR series (manufactured by Mitsubishi Rayon Co., Ltd.), "Matsumoto Microsphere (registered trademark)" M, M100 and M500 (which are manufactured by Matsumoto Yushi-Seiyaku Co., Ltd.), and "Nanostrength (registered trademark)" E40F, M22N and M52N (which are manufactured by Arkema).

Rubber particles may be also included in the flame retardant epoxy resin composition. As for the rubber particles, crosslinked rubber particles and core-shell rubber particles produced by the graft polymerization of different polymers on the surfaces of crosslinked rubber particles may be used, from the viewpoint of handling properties.

Examples of crosslinked rubber particles which are commercially available include FX501P (manufactured by Japan Synthetic Rubber Corporation) which comprises a crosslinked product of a carboxyl-modified butadiene-acrylonitrile copolymer, and the CX-MN series (manufactured by Nippon Shokubai Co., Ltd.) and YR-500 series (manufactured by Nippon Steel Chemical Co., Ltd.) each of which comprises acrylic rubber microparticles.

Examples of core-shell rubber particles which are commercially available include "Paraloid (registered trademark)" EXL-2655 (manufactured by Kureha Corporation) which comprises a butadiene-alkyl methacrylate-styrene copolymer, "Staphyloid (registered trademark)" AC-3355 and TR-2122 (which are manufactured by Takeda Pharmaceutical Co., Ltd.) each of which comprises an acrylic acid ester-methacrylic acid ester copolymer, "PARALOID (registered trademark)" EXL-2611 and EXL-3387 (which are manufactured by Rohm & Haas) each of which comprises a butyl acrylate-methyl methacrylate copolymer, and "Kane Ace (registered trademark)" MX series (manufactured by Kaneka Corporation).

As for the thermoplastic particles, polyamide particles and polyimide particles may be used for example. Polyamide particles are most preferable for greatly increasing the impact resistance of the cured epoxy resin composition due to the excellent toughness such particles impart to the cured epoxy resin composition. Among the polyamides, nylon 12, nylon 11, nylon 6, nylon 6/12 copolymer, and a nylon (semi-IPN nylon) modified to have a semi-IPN (interpenetrating polymer network) with an epoxy compound as disclosed in Example 1 of Japanese Patent Application Laid-open No. 1-104624 impart particularly good adhesive strength in combination with the epoxy resin(s). Examples of suitable commercially available polyamide particles include SP-500 (manufactured by Toray Industries Inc.) and "Orgasol (registered trademark)" (manufactured by Arkema), "Grilamid (registered trademark)" TR-55 (manufactured by EMS-Grivory), and "Trogamid (registered trademark)" CX (manufactured by Evonik).

Additives—Inorganic Particles

In certain embodiments of the present invention, any type of inorganic particle may be added, as long as the effect of the present invention is not deteriorated. Examples of suitable inorganic particles include metallic oxide particles, metallic particles and mineral particles. Furthermore, two or more types of these inorganic particles can be used in combination. The inorganic particles may be used to improve some functions of the cured epoxy resin composition and to impart some functions to the cured epoxy resin composition. Examples of such functions include surface hardness, anti-blocking properties, heat resistance, barrier properties, conductivity, antistatic properties, electromagnetic wave absorption, UV shield, toughness, impact resistance, and/or low coefficient of linear thermal expansion.

Examples of suitable metallic oxides include silicon oxide, titanium oxide, zirconium oxide, zinc oxide, tin oxide, indium oxide, aluminum oxide, antimony oxide, cerium oxide, magnesium oxide, iron oxide, tin-doped indium oxide (ITO), antimony-doped tin oxide and fluorine-doped tin oxide.

Examples of suitable metals include gold, silver, copper, aluminum, nickel, iron, zinc and stainless steel. Examples of suitable minerals include montmorillonite, talc, mica, boehmite, kaoline, smectite, xonotlite, vermiculite and sericite.

Examples of other suitable inorganic materials include carbon black, acetylene black, Ketjen black, carbon nanotube, graphene, aluminum hydroxide, magnesium hydroxide, glass beads, glass flakes and glass balloons.

Any suitable size of inorganic particles, for example a size of inorganic particles which is in the range of 1 nm to 10 μm, may be used. Further, the inorganic particle may have any suitable shape for example, spherical, needle, plate, balloon or hollow. The inorganic particles may be just used as a powder or used in a dispersion in a solvent like sol or colloid.

Furthermore, the surface of the inorganic particle may be treated by one or more coupling agents to improve the dispersibility and the interfacial affinity with the epoxy resin.

In certain embodiments of the present invention, the epoxy resin composition may contain any other materials in addition to or instead of the materials the materials mentioned above, as long as the effect of the present invention is not deteriorated. Examples of other materials which may be included in the epoxy resin composition include, but are not limited to, mold release agents, surface treatment agents, flame retardants (in addition to the organic phosphinic acid or organic phosphinic acid-modified epoxy resin), antibacterial agents, leveling agents, antifoaming agents, thixotropic agents, heat stabilizers, light stabilizers, UV absorbers, pigments, coupling agents and metal alkoxides.

The components of the epoxy resin composition may be mixed in a kneader, planetary mixer, triple roll mill, twin screw extruder, and the like. The epoxy resins and any thermoplastics, excluding curing agent(s) and accelerators, are added in the selected equipment. The mixture is then heated to a temperature in the range of 130 to 180° C. while being stirred so as to uniformly dissolve the epoxy resin(s). After this, the mixture is cooled down to a temperature of no more than 100° C., while being stirred, followed by the addition of the curing agent(s) and optional accelerator(s) and kneading to disperse those components. This method may be used to provide an epoxy resin composition with excellent storage stability.

Reinforcing Fiber

There are no specific limitations or restrictions on the type of a reinforcing fiber that can be used, as long as the effects of the invention are not deteriorated. Examples include glass fibers such as S glass, S-1 glass, S-2 glass, 5-3 glass, E-glass, and L-glass fibers, carbon fibers, and graphite fibers, organic fibers such as aramid fibers, boron fibers, metal fibers such as alumina fibers, silicon carbide fibers, tungsten carbide fibers, and natural/bio fibers. Particularly, the use of carbon fiber may provide cured FRC materials which have exceptionally high strength and stiffness and which are lightweight as well. Examples of suitable carbon fibers are those from Toray Industries having a standard modulus of about 200-280 GPa (Torayca® T300, T300J, T400H, T600S, T700S, T700G), an intermediate modulus of about 280-340 GPa (Torayca® T800H, T800S, T1000G, T1100G, M305, M30G), or a high modulus of greater than 340 GPa (Torayca® M40, M35J, M40J, M46J, M50J, M55J, M60J).

The form and the arrangement of a layer of reinforcing fibers used to prepare a fiber-reinforced composite material in accordance with the present invention are not specifically limited. Any of the forms and spatial arrangements of the reinforcing fibers known in the art such as long fibers in a direction, chopped fibers in random orientation, single tow, narrow tow, woven fabrics, mats, knitted fabrics, and braids may be employed. The term "long fiber" as used herein refers to a single fiber that is substantially continuous over 10 mm or longer or a fiber bundle comprising the single fibers. The term "short fibers" as used herein refers to a fiber bundle comprising fibers that are cut into lengths of shorter than 10 mm. Particularly in the end use applications for which high specific strength and high specific elastic modulus are desired, a form wherein a reinforcing fiber bundle is arranged in one direction may be most suitable. From the viewpoint of ease of handling, a cloth-like (woven fabric) form is also suitable for the present invention.

The FRC materials of the present invention may be manufactured using methods such as the prepreg lamination and molding method, resin transfer molding method, resin film infusion method, hand lay-up method, wet layup method, sheet molding compound method, filament winding method and pultrusion method, though no specific limitations or restrictions apply in this respect.

The resin transfer molding method is a method in which a reinforcing fiber base material is directly impregnated with a liquid thermosetting resin composition and cured. Since this method does not involve an intermediate product, such as a prepreg, it has great potential for molding cost reduction and is advantageously used for the manufacture of structural materials for spacecraft, aircraft, rail vehicles, automobiles, marine vessels and so on.

The prepreg lamination and molding method is a method in which a prepreg or prepregs, produced by impregnating a reinforcing fiber base material with a thermosetting resin composition, is/are formed and/or laminated, followed by the curing of the resin through the application of heat and pressure to the formed and/or laminated prepreg/prepregs to obtain an FRC material.

The filament winding method is a method in which one to several tens of reinforcing fiber rovings are drawn together in one direction and impregnated with a thermosetting resin composition as they are wrapped around a rotating metal core (mandrel) under tension at a predetermined angle. After the wraps of rovings reach a predetermined thickness, it is cured and then the metal core is removed.

The pultrusion method is a method in which reinforcing fibers are continuously passed through an impregnating tank filled with a liquid thermosetting resin composition to impregnate them with the thermosetting resin composition, followed by processing through a squeeze die and heating die for molding and curing, by continuously drawing the impregnated reinforcing fibers using a tensile machine. Since this method offers the advantage of continuously molding FRC materials, it is used for the manufacture of FRC materials for fishing rods, rods, pipes, sheets, antennas, architectural structures, and so on. Of these methods, the prepreg lamination and molding method may be used to give excellent stiffness and strength to the FRC materials obtained.

Prepregs may contain the epoxy resin composition and reinforcing fibers. Such prepregs may be obtained by impregnating a reinforcing fiber base material with an epoxy resin composition of the present invention. Impregnation methods include the wet method and hot-melt method (dry method).

The wet method is a method in which reinforcing fibers are first immersed in a solution of an epoxy resin composition, created by dissolving the epoxy resin composition in a solvent, such as methyl ethyl ketone or methanol, and retrieved, followed by the removal of the solvent through evaporation via an oven, etc. to impregnate reinforcing fibers with the epoxy resin composition.

The hot-melt method may be implemented by impregnating reinforcing fibers directly with an epoxy resin composition, made fluid by heating in advance, or by first coating a piece or pieces of release paper or the like with an epoxy resin composition for use as resin film and then placing a film over one or either side of reinforcing fibers as configured into a flat shape, followed by the application of heat and pressure to impregnate the reinforcing fibers with the resin. The hot-melt method may give a prepreg having virtually no residual solvent in it.

The prepreg may have a carbon fiber areal weight of between 40 to 700 g/m$^2$. If the carbon fiber areal weight is less than 40 g/m$^2$, there may be insufficient fiber content, and the FRC material may have low strength. If the carbon fiber areal weight is more than 700 g/m$^2$, the drapability of the prepreg may be impaired. The prepreg may also have a resin content of between 20 to 70 wt %. If the resin content is less than 20 wt %, the impregnation may be unsatisfactory, creating large number of voids. If the resin content is more than 70 wt %, the FRC mechanical properties could be impaired.

Appropriate heat and pressure may be used under the prepreg lamination and molding method, the press molding method, autoclave molding method, bagging molding method, wrapping tape method, internal pressure molding method, or the like.

The autoclave molding method is a method in which prepregs are laminated on a tool plate of a predetermined shape and then covered with bagging film, followed by curing, performed through the application of heat and pressure while air is drawn out of the laminate. It may allow precision control of the fiber orientation, as well as providing high-quality molded materials with excellent mechanical characteristics, due to a minimum void content. The pressure applied during the molding process may be 0.3 to 1.0 MPa, while the molding temperature may be in the 90 to 300° C. range (in one embodiment of the invention, in the range of 180° C. to 220° C., e.g., 200° C. to 220° C.).

The wrapping tape method is a method in which prepregs are wrapped around a mandrel or some other cored bar to form a tubular FRC material. This method may be used to produce golf shafts, fishing poles and other rod-shaped products. In more concrete terms, the method involves the wrapping of prepregs around a mandrel, wrapping of wrapping tape made of thermoplastic film over the prepregs under tension for the purpose of securing the prepregs and applying pressure to them. After curing of the resin through heating inside an oven, the cored bar is removed to obtain the tubular body. The tension used to wrap the wrapping tape may be 20 to 100 N. The curing temperature may be in the 90 to 300° C. range (in one embodiment of the invention, in the range of 180° C. to 220° C., e.g., 200° C. to 220° C.).

The internal pressure forming method is a method in which a preform obtained by wrapping prepregs around a thermoplastic resin tube or some other internal pressure applicator is set inside a metal mold, followed by the introduction of high pressure gas into the internal pressure applicator to apply pressure, accompanied by the simultaneous heating of the metal mold to mold the prepregs. This method may be used when forming objects with complex shapes, such as golf shafts, bats, and tennis or badminton rackets. The pressure applied during the molding process may be 0.1 to 2.0 MPa. The molding temperature may be between room temperature and 300° C. or in the 120 to 180° C. range (in one embodiment of the invention, in the range of 180° C. to 220° C., e.g., 200° C. to 220° C.).

The FRC materials that contain cured epoxy resin compositions obtained from epoxy resin compositions of the present invention and reinforcing fibers are advantageously used in general industrial applications, as well as aeronautics and space applications. The FRC materials may also be used in other applications such as sports applications (e.g. golf shafts, fishing rods, tennis or badminton rackets, hockey sticks and ski poles) and structural materials for vehicles (e.g. automobiles, bicycles, marine vessels and rail vehicles, drive shafts, leaf springs, windmill blades, pressure vessels, flywheels, papermaking rollers, roofing materials, cables, and repair/reinforcement materials).

In certain embodiments of the present invention, a burn time of the flame retardant fiber-reinforced composite material is less than 3 seconds, other embodiments not more than 2 seconds and still other embodiments not more than 1 seconds, as determined by the SFI 56.1 flammability testing standards. When the burn time is less than 3 seconds the sample can pass numerous flammability testing standards when more plies are added to the fiber-reinforced composite.

In certain embodiments of the present invention, when the flame retardant epoxy resin composition is cured, a burn length of the flame retardant fiber-reinforced composite material is not more than 2.0 inches, in other embodiments not more than 1.8 inches and still other embodiments not more than 1.6 inches, as determined by the SFI 56.1 flammability testing standards. When the burn length is not more than 2.0 inches the sample can pass numerous flammability testing standards when more plies are added to the fiber-reinforced composite.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Embodiments of the present invention are now described in more detail by way of examples. The measurement of various properties was carried out using the methods described below. These properties were, unless otherwise noted, measured under environmental conditions comprising a temperature of 23° C. and a relative humidity of 50%. Prepreg was then made from the example resins using a hot melt prepreg method. The components used in the working examples and comparative examples are as follows.

Component [A]<Low THR Epoxy Resins>
  Tetraglycidyl diaminodiphenylmethane, "Araldite (registered trademark)" MY9655T having an EEW of 117-134 g/eq (manufactured by Huntsman Advanced Materials).
  Triglycidyl p-aminophenol, "Araldite (registered trademark)" MY0510 having an EEW of 95-107 g/eq (manufactured by Huntsman Advanced Materials).
  Phenol-novolac epoxy resin, "Araldite (registered trademark)" EPN1138 having an EEW of 175-182 g/eq, functionality: 3.6 (manufactured by Huntsman Advanced Materials).
Component [A-1]
  Reaction product of diethyl phosphinic acid and "Araldite (registered trademark)" MY9655T at an equivalency ratio of 1:4 respectively.
  Reaction product of diethyl phosphinic acid and "Araldite (registered trademark)" MY0510 at an equivalency ratio of 1:3 respectively.
  Reaction product of diethyl phosphinic acid and "Araldite (registered trademark)" EPN1138 at an equivalency ratio of 1:3.6 respectively.
Component [E]
  Reaction product of diethyl phosphinic acid and EPON™ 828 at an equivalency ratio of 1:2 respectively.
  DOPO (di-hydro-9-oxa-10-phospha-phenanthrene-10-oxide)-modified multifunctional epoxy resin EXA 9726 (Manufactured by Dainippon Ink & Chemicals Inc.).
Other Epoxy Resins, other the Component [A], the Component [A-1], and the Component [E]
  Bisphenol A epoxy resin, Epon™ 828 having an EEW of 185-192 g/eq (manufactured by Hexion, Inc.).
  Bisphenol A epoxy resin, Epon™ 3002 having an EEW of 520-590 g/eq (manufactured by Hexion, Inc.).
Component [B]
  Diethyl phosphinic acid
  Diphenyl phosphinic acid
Component [C]: <Curing Agent>
  Dicyandiamide, "Dyhard (registered trademark)" 100S having an AEW of 12 g/eq (manufactured by AlzChem Trostberg GmbH).
  4,4-diaminodiphenylsulfone, "Aradur (registered trademark)" 9664-1 (manufactured by Huntsman Advanced Materials)
<Accelerator>
  2,4'-Toluene bis (dimethyl urea), "Omicure (registered trademark)" U-24M (manufactured by Huntsman Advanced Material).
<Thermoplastic>
  Poly Vinyl Formal, "Vinylec (registered trademark)" K (manufactured by JNC Corporation).

Methods

The following methods were used to prepare and characterize the epoxy resin composition, the prepreg and the FRC material for each example.
(1) Resin Mixing
  A mixture was created by dissolving prescribed amounts of all the components other than the curing agent and an accelerator in a mixer, and then prescribed amounts of the curing agent were mixed into the mixture along with prescribed amounts of the accelerator to obtain the epoxy resin composition.
(2) Adduct Formation
  The reacted products of diethyl phosphinic acid and the multifunctional epoxy resins (EPON™ 828, "Araldite (registered trademark)" MY510, "Araldite (registered trademark)" MY9655T) were made via constant stirring of the epoxy resin and the diethyl phosphinic acid at the prescribed ratios at a temperature of 100° C. for one hour.

(3) Cure Profile

The resulting cured epoxy resin composition was molded by the following method described in this section. After mixing, the epoxy resin composition prepared in (1) was injected into a mold set for a thickness of 2 mm using a 2 mm-thick "Teflon (registered trademark)" spacer. Then, the epoxy resin composition was heated at a rate of 1.7° C./min from room temperature to 163° C. and then kept for 15 minutes at 163° C. to obtain 2 mm-thick cured epoxy resin composition plates.

(4) Resin Flammability (Burn Time, Burn Length, Drips)

The specimens detailed in the Working and Comparative Examples were tested for flame retardancy per a flammability test modified from the SFI 56.1 flammability test specification for application to neat resin specimens. The SFI 56.1 Specification is specifically for CFRP testing and the example specimens are fiber-free when tested, the test needed to be modified.

The resin flammability test involved taking an epoxy resin composition that has been defoamed under vacuum and high shear mixing, casting the epoxy resin composition between two plates, with a 2 mm "Teflon® (registered trademark)" spacer, and curing at a specified temperature for a set amount of time. For the examples presented herein, the epoxy resin composition was cured at a temperature of 163° C. for 15 min, ramping to said temperature at a rate of 10° C./min. The cured resin plates were then demolded and machined into specimens measuring 2 inches×3 inches. The resin plates were placed in a flammability test chamber as shown in the FIGURE. The flame was at least 1550° F., with the visible flame being approximately 22 mm high when measured from the burner base, with the flame's faint outer blue cone at approximately 38 mm height from the burner base. The 3 inches side of the resin plate specimen was centered approximately 19 mm above the burner base. The flame was moved to underneath the resin specimen and held in place for 15 seconds, at which point the flame was removed and the time it took for the flame to extinguish was measured. Additionally, any drips of flaming epoxy resin material were recorded and the time those drips remain on fire was recorded. The witnessing of drips was considered an automatic failure of the flammability test. The burned length of the specimen was also recorded. These three values, burn time, burn length, and drip, are used to characterize a cured resin specimen's flammability. A lower burn time and a lower burn length are preferred qualities for flame retardant materials.

(5) THR

The Total Heat Release (THR) was measured by curing the combination of a single type of epoxy resin (e.g., just Tetraglycidyl diaminodiphenylmethane (TGDDM), or just Diglycidyl ether of bisphenol A (DGEBA), not together) with diamino diphenyl sulfone mixed at a 1:1 EEW (Epoxy Equivalent Weight) to AEW (Amine Equivalent Weight) ratio. This cured specimen was then machined to a 100 mm×100 mm×3 mm sample and tested via cone calorimeter with external heat flux set at 50 kW/m$^2$ for Heat Release Rate (HRR per ISO 5660-1). THR was calculated by integrating the HRR data over time.

(6) Glass Transition Temperature (Tg by DMA Torsion)

The epoxy resin composition was cured and molded by the method described below. After deforming under vacuum and high shear mixing, the epoxy resin composition prepared in (1) was injected into a mold set for a thickness of 2 mm using a 2 mm-thick "Teflon (registered trademark)" spacer. Then, the epoxy resin composition was cured at a specified temperature for a set amount of time. For the examples presented herein the resin was cured at a temperature of 163° C. for 15 min, ramping to said temperature at a rate of 10° C./min.

The specimen was then subjected to a Tg measurement in 1.0 Hz torsion mode using a dynamic viscoelasticity measuring device (ARES, manufactured by TA Instruments) by heating it to temperatures of 50° C. to 250° C. at a rate of 5° C./min in accordance with SACMA SRM 18R-94.

Tg was determined by finding the intersection between the tangent line of the glass region and the tangent line of the transition region from the glass region to the rubber region on the temperature-storage elasticity modulus curve (also called G' curve), and the temperature at that intersection was considered to be the glass transition temperature (also called the G' Tg).

However, when the cured resin composition has one or more loss elastic (viscous) modulus (G") peaks, Tg was determined by the following method. The height of each peak was calculated by subtracting the peak height in MPa by the corresponding valley that precedes the peak. If the height of any one of these peaks is over 15 MPa, then the corresponding transition on the G' curve was used to calculate the Tg.

(7) Resin Flexural Modulus of Elasticity

Flexural properties were measured in accordance with the following procedure. A specimen measuring 10 mm×50 mm was cut from the cured epoxy resin composition obtained following the process under Glass Transition Temperature (Tg) in (6). Then, the specimen was processed in a 3-point bend flexural test in accordance with ASTM D7264 using an Instron Universal Testing Machine (manufactured by Instron). The test specimens were tested at room temperature to obtain the RTD (Room Temperature Dry) flexural properties of the cured epoxy resin composition.

The following measurement methods were used to characterize the cured epoxy resin composition for each working and comparative example.

(i) Glass Transition Temperature (Tg)
(ii) Flexural modulus of Elasticity
(iii) Resin Flammability (Burn Length, Burn Time, Drips)

(8) Uncured Resin Viscosity

Uncured resin specimens were placed in a 40 mm diameter parallel plate rheometer (ARES, manufactured by TA Instruments) with a gap of 0.6 mm preheated to 40° C. Torsional displacement was applied at 10 rad/s. The temperature was increased at 2° C./min until the minimum viscosity of the resin was determined.

Working Examples 1-16 and Comparative Examples 1-6

The various amounts of the components used for each example are stated in Tables 1 to 4. The epoxy resin compositions shown in Tables 1, 2, 3, and 4 were produced in accordance with the following method: A mixture was created by dissolving prescribed amounts of all the components other than the curing agent and curing accelerator in a mixer, and then prescribed amounts of the curing agent were mixed into the mixture along with prescribed amounts of the accelerator to obtain the epoxy resin composition.

The produced epoxy resin compositions were cured by the methods described in the various testing descriptions. The results for each test are stated in Tables 1, 2, 3, and 4.

Working examples 1 through 16 in Tables 1, 2, and 3, being embodiments of the invention, provided good flammability results.

Working Examples 1-5 and Comparative Example 1

In working examples 1-5 and comparative example 1, the key difference between the compositions of WE 1-5 and CE 1 is that comparative example 1 lacks ≥0.5% phosphorus by weight. CE1 exhibits long burn time, length, and drips, while the working examples have low burn times, lengths, and no drips.

Working Example 6 and Comparative Example 2

In working example 6 and comparative example 2, the key difference is that comparative example 2 lacks a sufficient amount of phosphorus content. CE2 exhibits long burn time, length, and drips, while WE6 has low burn time, length, and no drips.

Working Examples 7 and Comparative Example 3

In working example 7 and comparative example 3, CE3 used EXA-9726, a DOPO (Di-hydro-9-oxa-10-phosphaphenantrene-10-oxide)-modified bifunctional epoxy resin (i.e., an organic phosphonous acid-modified epoxy resin), rather than an organic phosphinic acid-modified bifunctional epoxy resin as in WE7. While WE7 maintains a low burn time of 1.8 seconds, the burn time of CE3 is significantly higher at 13.5 seconds.

Working Example 8 and Comparative Example 4

In working example 8 and comparative example 4, the key difference is the phosphorus content of the two systems. Comparative example 4 lacks any organic phosphinic acid compound and did not achieve the good flame retardancy exhibited by working example 8.

Working Examples 1, 8-9 and Comparative Examples 5-6

In working examples 1, 8, 9 and comparative examples 5 and 6, the difference is the percent of the epoxy resin composition that is low THR epoxy resin (i.e., epoxy resin with a THR S 23 kJ/g). For the working examples, all mixtures contain at least 10% by weight of the low THR (≤23 kJ/g) epoxy resin and at least 15 PHR of the low THR epoxy resin. When the loading of the low THR epoxy resin is reduced below this threshold, an increase in the burn time is observed in comparative example 5 of 11.2 seconds, higher than the working examples' burn times of 4, 3.3, and 9.3 seconds respectively. Additionally, comparative example 6 exhibited dripping-a phenomenon only seen in other examples where the phosphorus content was 0% by weight.

Working Examples 8 and 15 in working examples 8 and 15, the key difference is the types of the low THR epoxy resins. When a glycidyl amine-type epoxy resin is used as the low THR epoxy resin, a decrease in the burn time is observed compared to not using the glycidyl amine-type epoxy resin as the low THR epoxy resin.

TABLE 1

| | | Phosphorus Content [wt %] | THR of base epoxy [kJ/g] | Units | WE1 | WE2 | WE3 | WE4 | WE5 | WE6 |
|---|---|---|---|---|---|---|---|---|---|---|
| Other Epoxy Resins | Epon ™ 828 | 0.0 | 26.0 | PHR | 10 | 10 | 10 | 10 | 10 | 25 |
| | Epon ™ 3002 | 0.0 | 24.8 | PHR | 10 | 10 | 10 | 10 | 10 | 25 |
| | EXA-9726 | 7. | 24.8 | PHR | — | — | — | — | — | — |
| Component [A] | Araldite ® MY9655T | 0.0 | 19.4 | PHR | 70 | 80 | 50 | 40 | 20 | 25 |
| | Araldite ® MY0510 | 0.0 | 17.2 | PHR | — | — | — | — | — | 3 |
| Component [A-1] | Diethyl Phosphinic Acid + Araldite ® MY9655T | 5.7 | 19.4 | PHR | 10 | — | 30 | 40 | 60 | — |
| | Diethyl Phosphinic Acid + Araldite ® MY0510 | 7.8 | 17.2 | PHR | — | — | — | — | — | 22 |
| | Diethyl Phosphinic Acid + Araldite ® EPN1138 | 6.6 | 19.2 | PHR | — | — | — | — | — | — |
| Component [E] | Diethyl Phosphinic Acid + Epon ™ 828 | 6.4 | 26.0 | PHR | — | — | — | — | — | — |
| Component [B] | Diethyl Phosphinic Acid | 25.4 | — | PHR | — | 7 | — | — | — | — |
| | Diphenyl Phosphinic acid | 14.2 | — | PHR | — | — | — | — | — | — |
| Component [C] | Dyhard ® 100S (Dicyandiamide) | 0.0 | — | PHR | 5 | 5 | 5 | 5 | 5 | 5 |
| | Aradur ® 9664-1 | 0.0 | — | PHR | — | — | — | — | — | — |
| Accelerator | U-24 | 0.0 | — | PHR | 3 | 3 | 3 | 3 | 3 | 3 |
| Thermoplastic | Vinylec ® K | 0.0 | — | PHR | 5 | 5 | 5 | 5 | 5 | 5 |
| Uncured resin properties | Viscosity at 40° C. | | | poise | 7792 | — | 9109 | — | 9591 | — |
| | Minimum viscosity | | | poise | 19 | — | 13 | — | 15 | — |
| Curing cycle | | | | | 163° C. × 15 minutes | | | | | |
| Cured resin properties | Glass Transition temperature | | | ° C. | 192 | 170 | 167 | 156 | 146 | 125 |
| | Flexural modulus of elasticity | | | GPa | 3.6 | 3.8 | 3.6 | 3.7 | 3.6 | 3.3 |
| | Resin Burn Length | | | in | 0.6 | 0.3 | 0.3 | 0.3 | 0.2 | 0.2 |
| | Resin Burn Time | | | sec | 4.0 | 1.4 | 3.6 | 1.4 | 2.1 | 3.0 |
| | Drips | | | | None | None | None | None | None | None |
| | Total Phosphorus Content of Resin | | | wt % | 0.5 | 1.5 | 1.5 | 2.0 | 3.0 | 1.5 |
| | Weight Percent of Resin with THR ≤23 kJ/g | | | wt % | 71 | 67 | 71 | 71 | 71 | 44 |
| | Total amount of Resin with THR ≤23 kJ/g | | | PHR | 80 | 80 | 80 | 80 | 80 | 50 |

*Amounts of ingredients are listed in ratios of PHR (per 100 resin)

TABLE 2

|  |  | Phosphorus Content [wt %] | THR of base epoxy [kJ/g] | Units | WE7 | WE8 | WE9 | WE10 | WE11 | WE12 |
|---|---|---|---|---|---|---|---|---|---|---|
| Other Epoxy Resins | Epon ™ 828 | 0.0 | 26.0 | PHR | 10 | 40 | 75 | 10 | 10 | 10 |
|  | Epon ™ 3002 | 0.0 | 24.8 | PHR | 10 | 40 | 10 | 10 | 10 | 10 |
|  | EXA-9726 | 7.0 | 24.8 | PHR | — | — | — | — | — | — |
| Component [A] | Araldite ® MY9655T | 0.0 | 19.4 | PHR | 53 | 20 | 15 | 45 | 50 | 50 |
|  | Araldite ® MY0510 | 0.0 | 17.2 | PHR | — | — | — | — | — | — |
| Component [A-1] | Diethyl Phosphinic Acid + Araldite ® MY9655T | 5.7 | 19.4 | PHR | — | — | — | 35 | 30 | 30 |
|  | Diethyl Phosphinic Acid + Araldite ® MY0510 | 7.8 | 17.2 | PHR | — | — | — | — | — | — |
|  | Diethyl Phosphinic Acid + Araldite ® EPN1138 | 6.6 | 19.2 | PHR | — | — | — | — | — | — |
| Component [E] | Diethyl Phosphinic Acid + Epon ™ 828 | 6.4 | 26.0 | PHR | 27 | — | — | — | — | — |
| Component [B] | Diethyl Phosphinic Acid | 25.4 | — | PHR | — | 7 | 7 | — | — | — |
|  | Diphenyl Phosphinic acid | 14.2 | — | PHR | — | — | — | — | — | — |
| Component [C] | Dyhard ® 100S (Dicyandiamide) | 0.0 | — | PHR | 5 | 5 | 5 | 5 | 5 | 5 |
|  | Aradur ® 9664-1 | 0.0 | — | PHR | — | — | — | — | — | — |
| Accelerator | U-24 | 0. | — | PHR | 3 | 3 | 3 | 3 | 3 | 3 |
| Thermoplastic | Vinylec ® K | 0.0 | — | PHR | 5 | 5 | 5 | 5 | — | 8 |
| Uncured resin properties | Viscosity at 40° C. |  |  | poise | — | — | — | 12374 | — | — |
|  | Minimum viscosity |  |  | poise | — | — | — | 38 | — | — |
| Curing cycle |  |  |  |  | 163° C. × 15 minutes | | | | | |
| Cured resin properties | Glass Transition temperature |  |  | ° C. | 158 | — | 123 | 172 | 167 | 171 |
|  | Flexural modulus of elasticity |  |  | GPa | 3.5 | — | 3.3 | 3.8 | 3.8 | 3.6 |
|  | Resin Burn Length |  |  | in | 0.7 | 0.3 | 0.4 | 0.3 | 0.3 | 0.3 |
|  | Resin Burn Time |  |  | sec | 1.8 | 3.3 | 9.3 | 2.0 | 1.0 | 1.1 |
|  | Drips |  |  |  | None | None | None | None | None | None |
|  | Total Phosphorus Content of Resin |  |  | wt % | 1.5 | 1.5 | 1.5 | 1.8 | 1.6 | 1.5 |
|  | Weight Percent of Resin with THR ≤23 kJ/g |  |  | wt % | 47 | 17 | 13 | 71 | 74 | 69 |
|  | Total amount of Resin with THR ≤23 kJ/g |  |  | PHR | 53 | 20 | 15 | 80 | 80 | 80 |

*Amounts of ingredients are listed in ratios of PHR (per 100 resin)

TABLE 3

|  |  | Phosphorus Content [wt %] | THR of base epoxy [kJ/g] | Units | WE13 | WE14 | WE15 | WE16 |
|---|---|---|---|---|---|---|---|---|
| Other Epoxy Resins | Epon ™ 828 | 0.0 | 26.0 | PHR | 10 | 10 | 65 | 10 |
|  | Epon ™ 3002 | 0.0 | 24.8 | PHR | 10 | 10 | 10 | 10 |
|  | EXA-9726 | 7.0 | 24.8 | PHR | — | — | — | — |
| Component [A] | Araldite ® MY9655T | 0.0 | 19.4 | PHR | 80 | 80 | — | 45 |
|  | Araldite ® MY0510 | 0.0 | 17.2 | PHR | — | — | — | — |
| Component [A-1] | Diethyl Phosphinic Acid + Araldite ® MY9655T | 5.7 | 19.4 | PHR | — | — | — | 35 |
|  | Diethyl Phosphinic Acid + Araldite ® MY0510 | 7.8 | 17.2 | PHR | — | — | — | — |
|  | Diethyl Phosphinic Acid + Araldite ® EPN1138 | 6.6 | 19.2 | PHR | — | — | 25 | — |
| Component [E] | Diethyl Phosphinic Acid + Epon ™ 828 | 6.4 | 26.0 | PHR | — | — | — | — |
| Component [B] | Diethyl Phosphinic Acid | 25.4 | — | PHR | — | 9.5 | — | — |
|  | Diphenyl Phosphinic acid | 14.2 | — | PHR | 13.4 | — | — | — |
| Component [C] | Dyhard ® 100S (Dicyandiamide) | 0.0 | — | PHR | 5 | — | 3 | 5 |
|  | Aradur ® 9664-1 | 0.0 | — | PHR | — | 46 | — | — |
| Accelerator | U-24 | 0.0 | — | PHR | 3 | — | 3 | 3 |
| Thermoplastic | Vinylec ® K | 0.0 | — | PHR | 5 | 5 | 5 | 5 |
| Uncured resin properties | Viscosity at 40° C. |  |  | poise | — | — | 11653 | — |
|  | Minimum viscosity |  |  | poise | — | — | 36 | — |
| Curing cycle |  |  |  |  | 163° C. × 15 minutes | | | 163° C. × 5 minutes |
| Cured resin properties | Glass Transition temperature |  |  | ° C. | 157 | 187 | 108 | 176 |
|  | Flexural modulus of elasticity |  |  | GPa | 4.1 | 3.6 | 3.5 | 3.6 |
|  | Resin Burn Length |  |  | in | 0.3 | 0.2 | 0.2 | 0.3 |
|  | Resin Burn Time |  |  | sec | 1.4 | 1.4 | 5.4 | 2.3 |
|  | Drips |  |  |  | None | None | None | None |
|  | Total Phosphorus Content of Resin |  |  | wt % | 1.5 | 1. | 1.5 | 1.8 |
|  | Weight Percent of Resin with THR ≤23 kJ/g |  |  | wt % | 63 | 50 | 23 | 71 |
|  | Total amount of Resin with THR ≤23 kJ/g |  |  | PHR | 80 | 80 | 25 | 80 |

*Amounts of ingredients are listed in ratios of PHR (per 100 resin)

TABLE 4

|  |  | Phosphorus Content [wt %] | THR of base epoxy [kJ/g] | Units | CE1 | CE2 | CE3 | CE4 | CE5 | CE6 |
|---|---|---|---|---|---|---|---|---|---|---|
| Other Epoxy Resins | Epon ™ 828 | 0.0 | 26.0 | PHR | 10 | 25 | 13 | 35 | 45 | 50 |
|  | Epon ™ 3002 | 0.0 | 24.8 | PHR | 10 | 25 | 10 | 35 | 45 | 50 |
|  | EXA-9726 | 7.0 | 24.8 | PHR | — | — | 24 | — | — | — |
| Component [A] | Araldite ® MY9655T | 0.0 | 19.4 | PHR | 80 | 25 | 53 | 30 | 10 | — |
|  | Araldite ® MY0510 | 0.0 | 17.2 | PHR | — | 25 | — | — | — | — |
| Component [A-1] | Diethyl Phosphinic Acid + Araldite ® MY9655T | 5.7 | 19.4 | PHR | — | — | — | — | — | — |
|  | Diethyl Phosphinic Acid + Araldite ® MY0510 | 7.8 | 17.2 | PHR | — | — | — | — | — | — |
|  | Diethyl Phosphinic Acid + Araldite ® EPN1138 | 6.6 | 19.2 | PHR | — | — | — | — | — | — |
| Component [E] | Diethyl Phosphinic Acid + Epon ™ 828 | 6.4 | 26.0 | PHR | — | — | — | — | — | — |
| Component [B] | Diethyl Phosphinic Acid | 25.4 | — | PHR | — | — | — | — | 7 | 7 |
|  | Diphenyl Phosphinic acid | 14.2 | — | PHR | — | — | — | — | — | — |
| Component [C] | Dyhard ® 100S (Dicyandiamide) | 0.0 | — | PHR | 5 | 5 | 5 | 5 | 5 | 5 |
|  | Aradur ® 9664-1 | 0.0 | — | PHR | — | — | — | — | — | — |
| Accelerator | U-24 | 0.0 | — | PHR | 3 | 3 | 3 | 3 | 3 | 3 |
| Thermoplastic | Vinylec ® K | 0.0 | — | PHR | 5 | 5 | 5 | 5 | 5 | 5 |
| Curing cycle |  |  |  |  | 163° C. × 15 minutes | | | | | |
| Cured resin properties | Glass Transition temperature |  |  | ° C. | 213 | 166 | 167 | 148 | — | — |
|  | Flexural modulus of elasticity |  |  | GPa | 3.3 | 3.3 | — | 3.3 | — | — |
|  | Resin Burn Length |  |  | in | 2.0[1] | 2.0[1] | 0.4 | 2.0[1,2] | 0.7 | 0.7 |
|  | Resin Burn Time |  |  | sec | 72.0 | 78.0 | 13.5 | 134.2 | 11.2 | 5.3[3] |
|  | Drips |  |  |  | Yes | Yes | None | Yes | None | Yes |
|  | Total Phosphorus Content of Resin |  |  | wt % | 0.0 | 0.0 | 1.5 | 0.0 | 1.5 | 1.5 |
|  | Weight Percent of Resin with THR ≤23 kJ/g |  |  | wt % | 71 | 44 | 47 | 27 | 8 | 0 |
|  | Total amount of Resin with THR ≤23 kJ/g |  |  | PHR | 80 | 50 | 53 | 30 | 10 | 0 |

[1]Full Length of Specimen Burned;
[2]Full Width of Specimen Burned;
[3]Flaming part dripped down
*Amounts of ingredients are listed in ratios of PHR (per 100 resin)

What is claimed is:

1. A method for making a flame retardant epoxy resin composition for fiber-reinforced composite material, the method comprising:
   combining a component [A] with a component [B] to form a component [A-1], followed by
   adding to the component [A-1] a thermoplastic resin selected from polyvinyl acetal resin, polyvinyl alcohol, phenoxy resin, polyamide, polyimide, polyvinyl pyrrolidone, polysulfone, or polyethersulfone, and kneading at 130° C. to 180° C. using a kneader, planetary mixer, three-roll mill, or twin-screw extruder until the thermoplastic resin dissolves in the component [A-1], followed by
   adding a component [C],
   wherein:
   the flame retardant epoxy resin composition has a phosphorus content of at least 0.5% by weight based on the total weight of the flame retardant epoxy resin composition;
   the flame retardant epoxy resin composition has a minimum viscosity of 0.1 to 200 poise, and the component [A] is comprised of at least one low total heat release (THR) multifunctional epoxy resin having a total heat release (THR) value of ≤23 KJ/g, wherein a total amount of low THR multifunctional epoxy resins is at least 15 PHR to 85 PHR;
   the flame retardant epoxy resin composition is comprised of at least one high THR multifunctional epoxy resin having a THR value of greater than 23 KJ/g;
   the component [A-1] is comprised of at least one low THR multifunctional epoxy resin that contains at least one residue of at least one organic phosphinic acid;
   the component [B] is comprised of at least one organic phosphinic acid;
   the component [C] is comprised of at least one curing agent; and
   the at least one low THR multifunctional epoxy resin is comprised of at least one epoxy resin having at least one glycidyl amino group and/or diglycidyl amino group.

2. The method according to claim 1, wherein the at least one organic phosphinic acid includes at least one organic phosphinic acid corresponding to formula (I):

wherein $R^1$ and $R^2$ are independently selected from an alkyl group having from 1 to 10 carbon atoms or an aryl group having from 6 to 10 carbon atoms.

3. The method according to claim 1, wherein the at least one curing agent includes at least one dicyandiamide.

4. The method of according to claim 1, further comprising heating for a time and at a temperature effective to achieve at least partial reaction of the at least one organic phosphinic acid with at least one THR multifunctional epoxy resin.

5. The method according to claim 1, wherein reinforcing fiber matrix is impregnated with the flame retardant epoxy resin composition to form a prepreg.

6. The method according to claim 5, wherein a fiber-reinforced composite material is obtained by curing the prepreg.

7. The method according to claim 6, wherein the fiber-reinforced composite material is obtained by curing the prepreg at a temperature of from 163° C. to 200° C.

* * * * *